Aug. 12, 1947.    M. WATTER    2,425,499
WING-BODY STRUCTURE FOR AIRPLANES
Filed March 2, 1945    5 Sheets-Sheet 1

INVENTOR
Michael Watter.
BY John P. Tarbox
ATTORNEY

Aug. 12, 1947.   M. WATTER   2,425,499
WING-BODY STRUCTURE FOR AIRPLANES
Filed March 2, 1945   5 Sheets-Sheet 2

INVENTOR
Michael Watter.
BY John P. Tarbox
ATTORNEY

Aug. 12, 1947.　　　M. WATTER　　　2,425,499
WING-BODY STRUCTURE FOR AIRPLANES
Filed March 2, 1945　　　5 Sheets-Sheet 4

INVENTOR
Michael Watter.
BY John P. Tarbox
ATTORNEY

INVENTOR
Michael Watter.
BY John P. Tarbox
ATTORNEY

Patented Aug. 12, 1947

2,425,499

UNITED STATES PATENT OFFICE 2,425,499

WING-BODY STRUCTURE FOR AIRPLANES

Michael Watter, Philadelphia, Pa., assignor to The Budd Company, Philadelphia, Pa., a corporation of Pennsylvania Application March 2, 1945, Serial No. 580,644

7 Claims. (Cl. 244—118)

The invention relates to wing-body structure for airplanes and more particularly to the cargo-carrying type of airplanes. This application is a continuation-in-part of my copending application, Serial No. 451,390, filed July 18, 1942.

It is a main object of the invention to provide an airplane of this class which is designed to carry a maximum of cargo load and at the same time is easy to handle under all load conditions and also possesses a high aerodynamic efficiency.

It is a further object to provide an airplane of this class which can readily be converted from peacetime use to wartime use, i. e., it is equally adapted to carry bulk cargo or live cargo, such as parachute troops or other task forces to be landed in enemy territory, together with the equipment which such task forces require, including motor vehicles, guns and gun mounts, etc.

It is a further object to provide an airplane of this class which is designed to facilitate the loading and unloading of the cargo space thereof, particularly so that the unloading of cargo, such as troops and rolling cargo, may commence even before the plane has rolled to a stop in landing.

It is a further object to so construct the airplane that it may be readily manufactured out of sheet metal, such as light gauge stainless steel, whereby light weight with high strength and low ultimate cost considering the added life to be expected due to the use of this material, may be attained.

It is a further object to provide novel and highly efficient accommodations for the crew, affording a large angle of vision and safety in the event of a crash landing.

It is a further object of the invention to combine elements of the cantilever wing structures with the body structure to which they are secured so as to enclose a large cargo space with a minimum of overall cross-section of the body, and particularly with a minimum of height.

These objects are achieved in large part by having a longitudinal cargo space enclosed by the main body of the plane so that the center of said space is substantially in the vertical line of the resultant lift of the supporting surfaces. These surfaces are preferably cantilever wings having vertically extending root portions at their inboard ends, and these root portions form the sides of centrally open bulkheads enclosing the cargo space and disposed within the outer contours of the body. The bulkheads are completed around the cargo space by transverse braces interconnecting the vertically extending root portions of the respective wings across the top and bottom of said space. The body is extended rearwardly of the cargo space by a tail portion having a longitudinally extending opening in its bottom wall which communicates directly with the cargo space. This arrangement facilitates the loading and unloading of said cargo space.

The loading and unloading opening is normally closed by closure means comprising a door which is hinged at the forward margin of the opening, and serves when lowered as a loading platform or ramp over which the cargo can be conveniently loaded and unloaded. When the free end of the door is supported from the ground it can be used as a ramp to drive motor vehicles into and discharge them from the cargo space, and this discharge can be carried out while the plane is rolling to a stop in landing, so that no time is lost in discharging the cargo. This is particularly important in wartime, when unloading task forces in the enemy territory. Preferably the door opening is of substantially the full cargo space width, whereby the loading and unloading can be carried out for the full width of said space.

The control or pilot's compartment is preferably arranged forward of the transverse bulkhead dividing the cargo space from the rounded nose portion of the body. The floor of this compartment is preferably a substantial distance below the top of the cargo space but above the major portion of the cargo space, so that the pilot and other members of the crew in the pilot's compartment are protected from injury by forwardly shifting cargo in the event of a crash landing. At the same time, the top of the pilot's compartment projects but slightly above the main body, and therefore does not materially increase the overall height of the body. In order to insure a maximum range of vision in all directions, the top of the pilot's compartment may be formed with a shallow dome rising from the top of the cargo space, suitable windows being provided in this domed portion.

Preferably, particularly in the smaller type of aircraft, to raise the tail portion above the ground a distance sufficient to permit a vehicle, as a truck to be moved under the loading opening, the bottom of the tail is angled upwardly from the bottom of the main body, and to avoid all obstruction of the landing gear usually provided under the tail portion, the plane is supported from the ground by a tricycle landing gear, located in advance of the tail portion within the plan projection of which the center of gravity of the plane is located. The tail portion is free of the ground.

To prevent any turning over tendency of the plane in loading and unloading, brace means is provided, which cooperates with the landing gear, to maintain the plane in normal ground attitude during loading and unloading.

For ease of construction the outer contour lines of the main portion of the body of the plane enclosing the cargo space are longitudinally straight and of plane and simple curvature form, and to improve the streamline effect the contour of this main body portion merges gradually with the compound contours of the nose and tail portions.

Other objects and advantages and the manner and means by which they are attained are further clarified by the following detailed description when read in connection with the accompanying drawings forming a part hereof:

Figure 6:
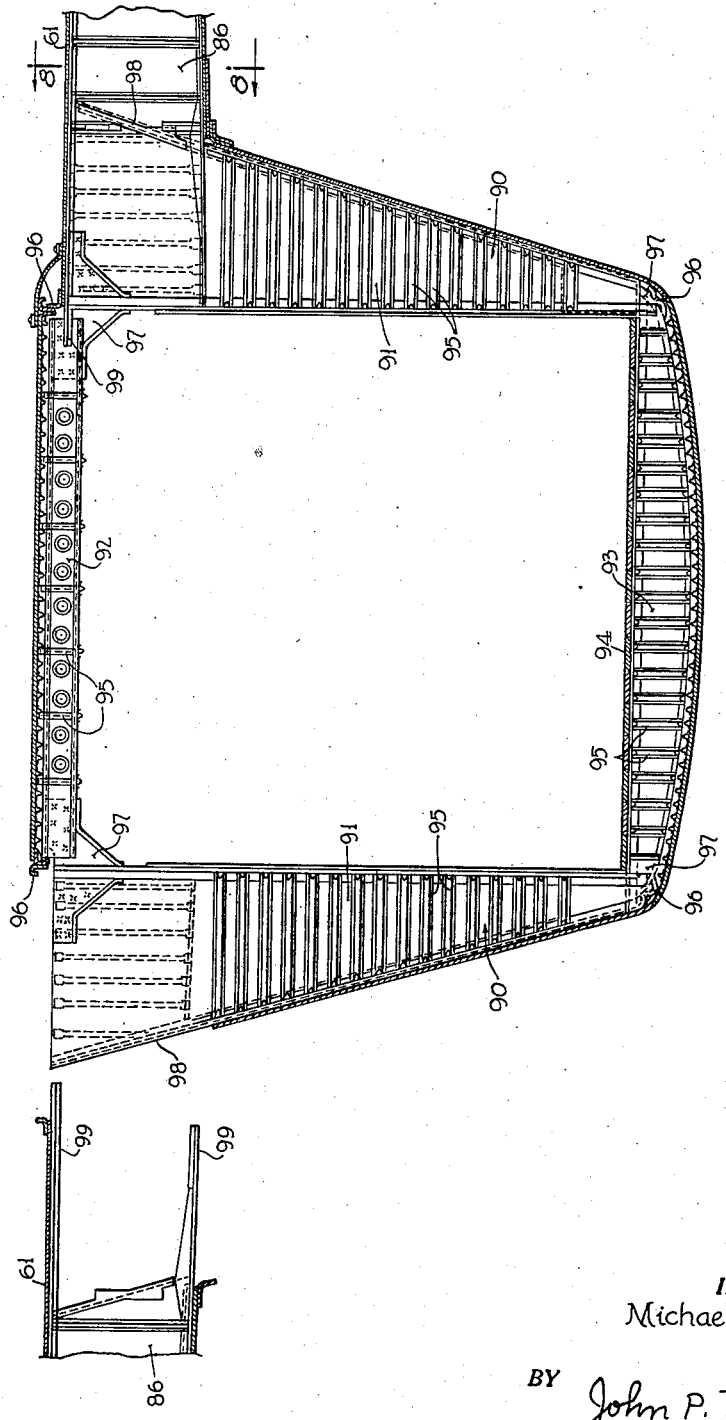
Figure 6 is a vertical transverse section on the line 6—6 of Figure 5.
Figure 7:
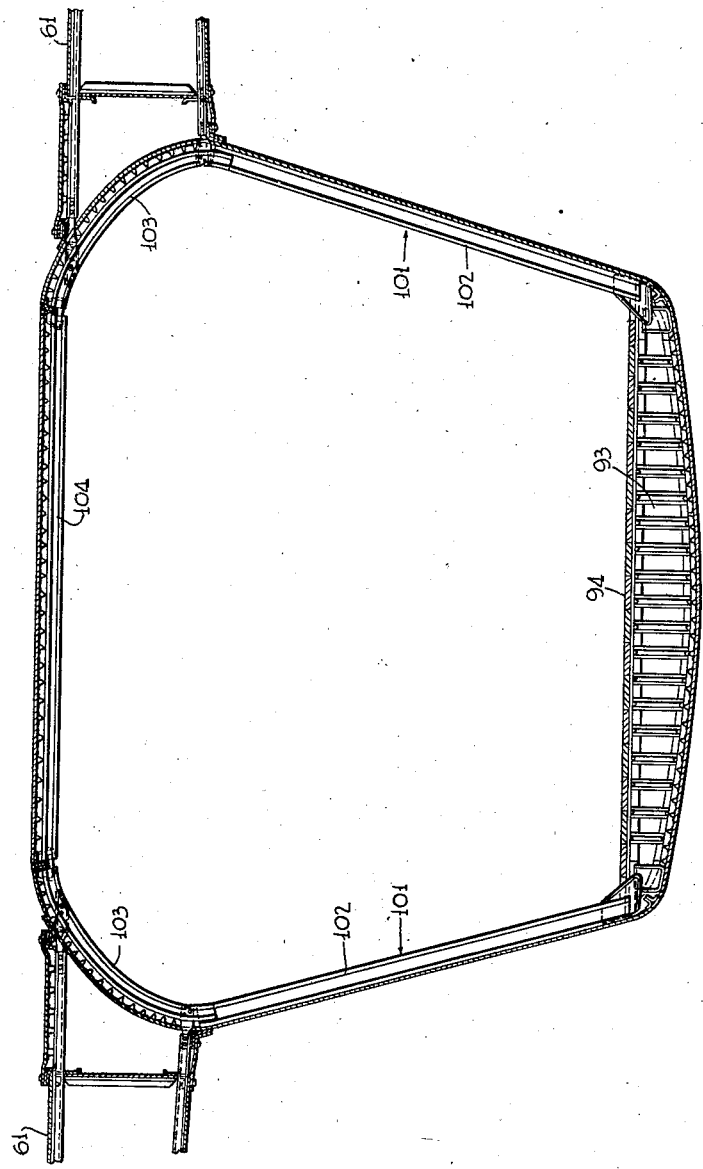
Figure 7 is a vertical transverse section on the line 7—7 of Figure 5.
Figure 8:
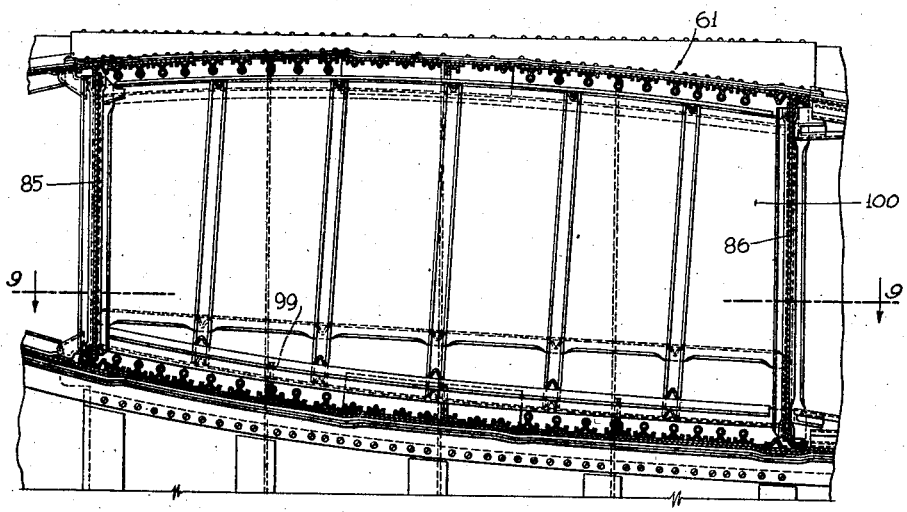
Figure 9:
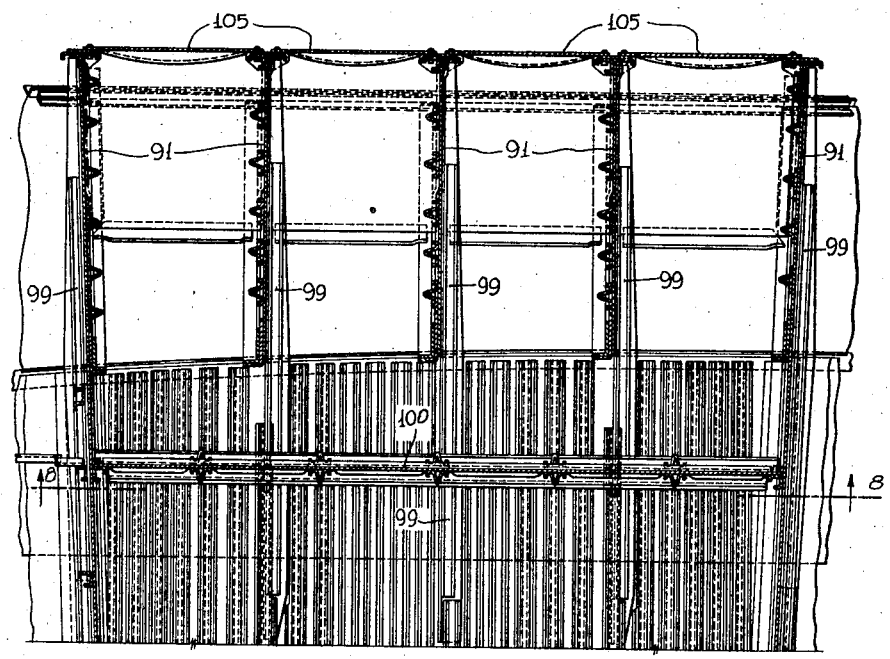

Figure 8 is an enlarged partial section taken on the line 8—8 of Figures 6 and 9; and Figure 9 is a section taken on the line 9—9 of Figure 8.

Figure 3:
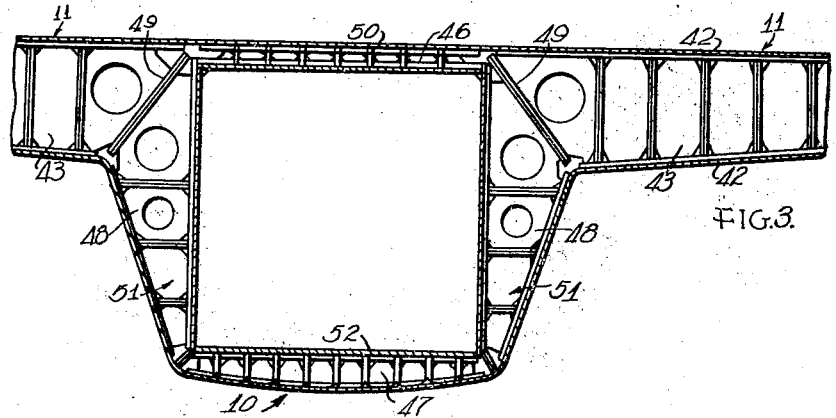
Figure 3 is a fragmentary transverse sectional view through the body and the roots of the wings showing more or less diagrammatically the relation therebetween.
Figure 1:
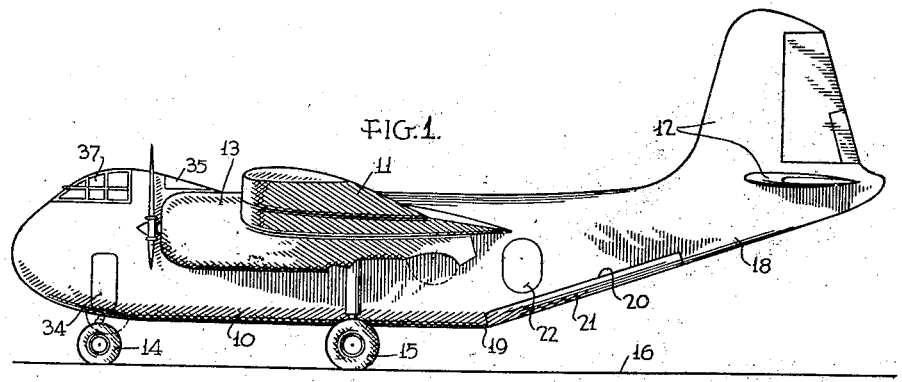
Figure 1 is a side elevational view of an airplane embodying the invention, the airplane being shown resting on the ground.
Figure 2:
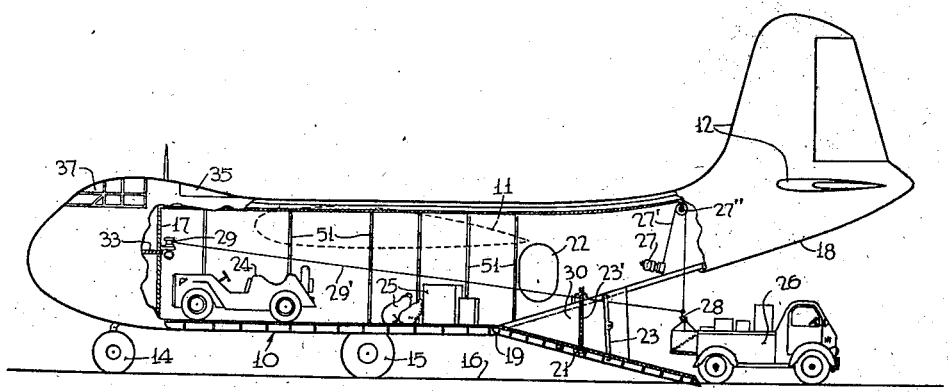
Figure 2 is a view similar to Figure 1 with parts broken away and in section, showing the plane in the process of loading.
Figure 4:
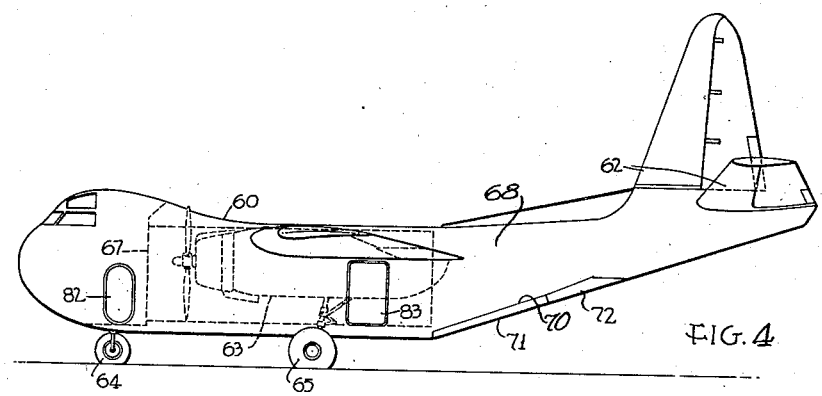
Figure 4 is a side elevation of a slightly modified form of airplane.
Figure 5:
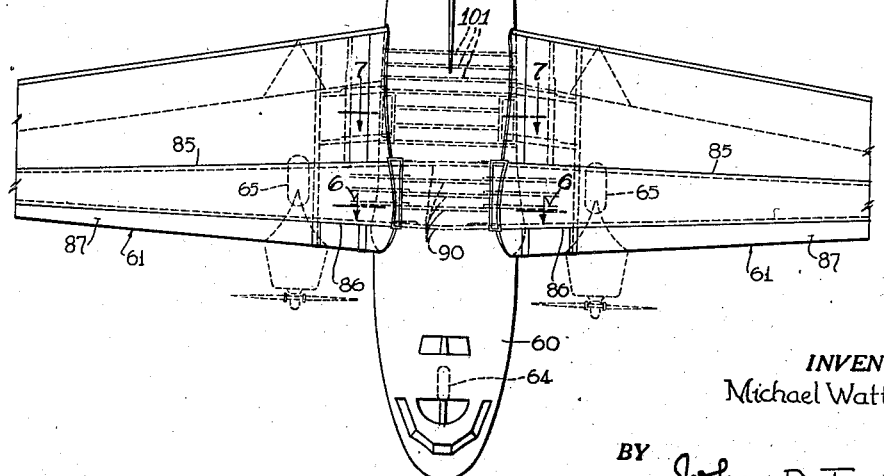
Figure 5 is a top plan view of the airplane shown in Fig. 4.

In the embodiment of the invention shown in Figures 1 to 3 of the drawings, the body of the plane is generally designated by the numeral 10, the cantilever wings by 11, the tail surfaces by 12, the engine nacelles by 13 and the landing gear wheels by 14 and 15. Wheels 14 and 15 constitute a tricycle landing gear. Wheel 14 mounted in the nose of the body 10 may be used as a steering wheel and wheels 15 are laterally spaced main load-carrying wheels mounted in the wings in the vertical plane of the respective engine nacelles 13.

The wheels may be, and preferably are, of the retractible type partly or wholly retracted into the body or wings in flight, as shown, for example, in dotted lines in Figure 1.

When the plane is resting on the ground with the landing wheels down as shown in Figure 1, the main portion of the body 10 is spaced from and generally in parallel relation to the ground, indicated in said figure by numeral 16.

The central main portion of the body 10 extending from a transverse bulkhead 17, Figure 2, to approximately the trailing edges of the wings 11 where they merge with the body encloses an elongated clear cargo space. The center of this cargo space is substantially in the vertical line through the center of lift of the wings, the approximate outline of a wing where it joins the body being shown in dotted lines in Figure 2.

This cargo space is surrounded in the wing securement region by centrally open bulkheads indicated in diagrammatic fashion, at 51, in Figure 2, and one of them, in transverse alignment with and secured to wing spars 43, being shown in greater detail in Figure 3. These bulkheads are within the outer contour of the body but are of substantially less cross-sectional area than the cross-sectional area of the cargo space enclosed by them.

The wings 11 each may comprise a main body portion tapering in thickness and width from tip to root and are joined, as at 49, to substantially vertical extensions or wing root portions 48 which form the sides of bulkheads 51. These vertical wing root extensions 48 are preferably tapered from the point of maximum stress adjacent their joinder to the wing body portion to their ends remote from said joint. The bulkheads are completed by vertically shallow braces 46 and 47 flanking the top and bottom of the cargo space and interconnecting the tops and bottoms of the vertical sides 48. These braces 46 and 47 may be made of relatively shallow vertical depth as compared with the depth of the bulkhead sides 48 adjacent their securement to the wing spars 43 because they are not called upon to carry such heavy stresses. The bottom braces, as 47, because they support the flooring 52 of the cargo space, are made somewhat deeper than the top braces, as 46.

In the form shown, the tops of the wings 11 at their roots are substantially in the plane of the top 50 of the body but this arrangement is not essential, as the wings might have their roots disposed anywhere in the height of the body and still achieve substantially all the advantages of the invention.

The construction hereinbefore described insures a large cross-section clear cargo space within an external body and wing root contour of minimum height and width, and this space is substantially the maximum clear space obtainable with a plane of a given external contour.

To facilitate the loading and unloading of the cargo space, the bottom of the tail 18 is angled upwardly from its junction with the main body portion enclosing said space (see Figure 2), and an elongated opening 20 is provided in said bottom which communicates directly with the cargo space. This opening is preferably of substantially the width of the cargo space, so that the cargo can be most expeditiously loaded or unloaded.

The opening is normally closed by closure means comprising a door 21 which is hinged along the forward margin of the opening, as at 19, and when lowered, as shown in Figure 2, about its hinge, the door serves as a loading or unloading platform or ramp over which vehicles, as 24, or other cargo, as 25, may be transported into or from the plane. The ramp may be of such length and angle with respect to the body bottom that the loading space between the rear edge of the opening and the ramp is of a height substantially equal to the height of the cargo space, thus permitting loading over the ramp of cargo of substantially the full height of said space.

Inside the plane suitable loading and unloading tackle may be provided. For example, a winch 27 in which a cable 27' passing over a pulley 27" and provided with a hook 28 may be used to lift and lower cargo through the opening 20 either from the ground or from a truck 26, as shown in Figure 2. The cargo so lifted may be transferred longitudinally forwardly into the cargo space by a cable 29' wound over a winch 29 secured to the forward bulkhead 17 and having its free end secured to the hook 28. Thus it will be seen that by proper manipulation of the winches, bulk cargo, as 25, may be expeditiously loaded and unloaded to and from the cargo space. While a specific means for transfer of the cargo has been shown and described, it will be understood that other known means of cargo transfer could also be used on the plane.

Locking means is provided to lock the door down with its free edge in engagement with or otherwise supported from the ground. In the drawings two forms of such locking means have been shown, but it will be understood that either form might be used without the other, or both together.

One such locking means comprises toggles, as 23, secured to the opposite sides of the door and the lateral margins of the opening, which toggles, when straightened out, as shown in Figure 2, positively lock the door in down position. In this position, the toggles serve as a brace for the rear of the plane and, in cooperation with the landing gear, prevent tilting down of the tail or other overturning tendency of the plane when loading and unloading the same.

The other locking means for the door is inherent in the type of means used for moving the door from open to closed position and vice versa. As shown most clearly in Figure 2, this moving means may comprise a prime mover, as a motor (not shown) mounted on the door, preferably between its upper and lower faces, which motor through appropriate gearing drives two vertical worms, as 23', journalled at their lower ends in the door and at their upper portions screwing into nuts mounted for pivotal movement at the sides of the opening. From this arrangement it will be seen that the door can be moved to any position by the motor, but as soon as the motor is stopped it will be automatically locked due to the small pitch of the worms 23' engaging their nuts.

To partially close the gaps between the sides of the door and the opening adjacent the hinged end, canvas or other flexible closure sheets 30 may be employed, as shown in Figure 2.

It will thus be seen that the door has a number of uses and as hinged at the front has particular advantages for the quick discharge of task forces, etc., since it can be lowered and the cargo discharged before the plane has come to a stop. Separate means of access and egress from the cargo space may also be had through a side door 22, Figure 1.

The nose portion in front of bulkhead 17 is equipped for the safety and comfort of the crew. It is divided by a horizontal partition or floor 33 into an upper pilot's compartment or control room, and into a lower compartment. A doorway 34 is formed in the left-hand side of the lower compartment. A doorway (not shown) in the bulkhead 17 may provide access from the nose to the cargo space. A stairway centrally of the lower compartment affords access to the upper or pilot's compartment.

The floor of the pilot's compartment is arranged, as clearly appears in Figure 2, a distance below the top of the cargo space so as to bring most of the pilot's compartment vertically within the height of the body, thus adding very little to the overall height of the body above that of the height required for the cargo space. On the other hand, it is raised a sufficient distance above the floor of the cargo space to avoid the major part of shifting cargo, such as would be caused by a crash landing. Thus, the men in the control room are relatively safe from injury through such cause.

Preferably, to increase the head room in the pilot's compartment, and the range of vision of the pilot when seated, the top of the pilot's compartment is in the form of a shallow dome rising at the rear from the top of the cargo space. Windows 37 at front and sides and a window 35 in the rear of the dome, are provided, to obtain a full range of vision from the pilot's seat. The bulkhead 17 may have an opening in its upper region, of a size to give the pilot a full range of vision through the rear window 35.

In Figures 4 to 9 there is shown another embodiment comprising a body or fuselage 60, wings 61, tail surfaces 62, nacelles 63, nose landing wheel 64, main landing wheels 65, a full cargo compartment bulkhead 67, tail 68, bottom opening 70 therein, ramp door 71 and clearance doors 72 therefore. Side doors 82 and 83 may be provided at the front and back respectively.

The wings 61 are provided with a main spar 85 extending the full length of the wing, a stub spar 86 extending to the outer side of the nacelle 63, and a hollow leading edge spar 87 extending from the outer end of the stub spar to the end of the wing.

Between the inner ends of the wings and in the main load-carrying zone thereof, between spars 85 and 86, the body is provided with a plurality, five as shown, of hollow girdle bulkheads 90 furnishing anchorage for the root ends of the wings but leaving a large cargo space therein. As best shown in Figure 6, the wing-body bulkheads 90 comprise triangular sides 91, a relatively shallow top beam or girder 92 and a somewhat deeper bottom girder 93 upon which the cargo floor 94 is disposed. The girders 93 are straight on the top edge and convex on the bottom edge. All four sides of the bulkhead are made of sheet stock reinforced by stiffeners 95. The inner edges of the sides are rectilinear and define a rectangular opening; the outer edges are disposed in alignment with the stream-line sides of the body. The sides of the bulkheads are joined at the four corners by longerons 96 and gussets 97.

The wing roots may be connected at any place between the top and bottom of the body, preferably, as shown, at the top adjacent the upper base line of the triangular bulkhead side. The wing and bulkhead side webs are joined along the inclined outer edge of the bulkhead side, as along the joint line 98. There is a bulkhead for each of the spars 85 and 86 of the wing and several (three here) for the space between the spars for anchoring the stringer-reinforced skin blankets of the wing. The spars and the skin blankets have splice strips 99 which extend across the bulkhead side webs and are secured thereto in shear, as by welding, riveting, or the like. The body covering is left off at the upper part and top of the bulkhead sides for insertion of the wing root elements. The wing carries the covering for the top of the bulkhead sides. The upper splice strip 99 extends along part of the end of the top girder 92 and is secured thereto in shear. It reinforces the connection of longeron 96 and gusset 97.

In Figures 8 and 9, the wing roots are shown in detail, where in addition to the stringer-reinforced skin blankets, spars, and bulkheads, a wing rib 100 appears.

In the region outside the wing-body bulkhead zone the body girdle bulkheads 101 are much lighter. They comprise floor girders 93 for the floor 94, as elsewhere, but light side elements 102, curved top portions 103, and a top girder 104. As before, the outer covering is in longitudinal alignment with the streamline sides of the body, and since the side frames are narrow, the interior space enlarges toward the top.

The bulkhead sides 91 are connected interiorly by reinforced cover plates 105.

The clearance doors 72 hinge at the side and rear to swing upward and outward within the body, giving full headroom and permitting the use of a ramp of proper length to provide a usable slope without extending so far back as to unduly restrict the headroom.

While certain embodiments of the invention have been illustrated and described by way of example, it is to be understood that there may be various embodiments within the limits of the prior art and the scope of the subjoined claims.

What is claimed is:

1. An airplane comprising a body of streamline shape, cantilever wings secured to the sides of the body, the depth of the wings at their roots to the body being less than half the depth of the body, the wing roots being connected by open bulkheads located wholly within the streamline shape of the body and interiorly defining a generally rectangular cargo compartment, the bulkheads in vertical section comprising triangular side frame members which are wide spanwise at the wing roots and which taper down away from the wing roots, one long side of the triangular section defining the streamline outer surface at that point, another long side of the triangular section defining a vertical side wall of the cargo compartment, and the short triangular side being located within the wing root, and upper and lower transverse bulkhead frame members connecting the triangular side members together at their upper and lower ends, said transverse members being much thinner in greatest cross section dimension than said side frame members at the wing roots.

2. An airplane comprising a body of streamline shape, cantilever wings secured to the sides of the body, the depth of the wings at their roots to the body being less than half the depth of the body, the wing roots being connected by open bulkheads located wholly within the streamline shape of the body and interiorly defining a generally rectangular cargo compartment, the bulkheads in vertical section comprising triangular side frame members which are wide span-wise at the wing roots and which taper down away from the wing roots, one long side of the triangular section defining the streamline outer surface at that point, another long side of the triangular section defining a vertical side wall of the cargo compartment, and the short triangular side being located within the wing root, and upper and lower transverse bulkhead frame members connecting the triangular side members together at their upper and lower ends, said transverse members being much thinner in greatest cross section dimension than said side frame members at the wing roots, the lower transverse member being rectilinear on its upper side to provide a level floor support and being convex on its lower side to provide high beam strength and to conform to the curved streamline shape at its location.

3. An airplane comprising a body of streamline shape, cantilever wings secured to the sides of the body, the depth of the wings at their roots to the body being less than half the depth of the body, the wing roots being connected by open bulkheads located wholly within the streamline shape of the body and interiorly defining a generally rectangular cargo compartment, the bulkheads in vertical section comprising triangular side frame members which are wide span-wise at the wing roots and which taper down away from the wing roots, one long side of the triangular section defining the streamline outer surface at that point, another long side of the triangular section defining a vertical side wall of the cargo compartment, and the short triangular side being located within the wing root, and upper and lower transverse bulkhead frame members connecting the triangular side members together at their upper and lower ends, said transverse members being much thinner in greatest cross section dimension than said side frame members at the wing roots, the upper transverse member being lighter than the lower transverse member and being rectilinear on both its upper and lower sides.

4. An airplane comprising a body of streamline shape, cantilever wings secured to the sides of the body, the depth of the wings at their roots to the body being less than half the depth of the body, the wing roots being connected by open bulkheads located wholly within the streamline shape of the body and interiorly defining a generally rectangular cargo compartment, the bulkheads in vertical section comprising triangular side frame members which are wide span-wise at the wing roots and which taper down away from the wing roots, one long side of the triangular section defining the streamline outer surface at that point, another long side of the triangular section defining a vertical side wall of the cargo compartment, and the short triangular side being located within the wing root, and upper and lower transverse bulkhead frame members connecting the triangular side members together at their upper and lower ends, said transverse members being much thinner in greatest cross section dimension than said side frame members at the wing roots, both transverse members being rectilinear on their interior sides, the upper transverse member also being rectilinear on its outer side, and the lower transverse member being convex on its outer side.

5. An airplane comprising a body of streamline shape cantilever wings secured to the sides of the body, the depth of the wings at their roots to the body being less than half the depth of the body, the wing roots being connected by open bulkheads located wholly within the streamline shape of the body and interiorly defining a generally rectangular cargo compartment, the bulkheads in vertical section comprising triangular side frame members which are wide spanwise at the wing roots and which taper down away from the wing roots, one long side of the triangular section defining the streamline outer surface at that point, another long side of the triangular section defining a vertical side wall of the cargo compartment, and the short triangular side being located within the wing root, and upper and lower transverse bulkhead frame members connecting the triangular side members together at their upper and lower ends, said transverse members being much thinner in greatest cross section dimension than said side frame members at the wing roots, all of said bulkhead members having stiffening elements disposed transversely to their greatest length.

6. An airplane comprising a body of streamline shape, cantilever wings secured to the sides of the body, the wing roots being connected by open bulkheads located wholly within the streamline shape of the body and interiorly defining a rectangular cargo compartment, the bulkhead comprising triangular side members having their greatest transverse dimension in the wing root, and top and bottom members connecting the ends of the triangular members, the wings, side members, top members and bottom members comprising units which are secured together at their junctures in the assembly.

7. An airplane comprising a body of streamline shape, cantilever wings secured to the sides of the body, the wing roots being connected by open bulkheads located wholly within the streamline shape of the body and interiorly defining a rectangular cargo compartment, the bulkhead comprising triangular side members having their greatest transverse dimension in the wing root, and top and bottom members connecting the ends of the triangular members, the wings, side members, top members and bottom members comprising units which are secured together at their junctures in the assembly, all of said members being provided with spaced transverse stiffeners extending in a direction away from the interior of the compartment.

MICHAEL WATTER.

REFERENCES CITED

The following references are of record in the file of this patent:

UNITED STATES PATENTS

| Number | Name | Date |
|---|---|---|
| 1,516,295 | Huntington | Nov. 18, 1924 |
| 2,095,440 | Hojnowski | Oct. 12, 1937 |
| 2,268,009 | Babb et al. | Dec. 30, 1941 |
| 1,822,943 | Wagner | Sept. 15, 1931 |
| 2,323,279 | Van Zelm | June 29, 1943 |